United States Patent Office 3,127,400
Patented Mar. 31, 1964

3,127,400
1,2-DIMETHYLHEXAHYDROPYRIDAZINE COMPOUNDS
Harry R. Snyder, Jr., Norwich, N.Y., assignor to The Norwich Pharmacal Company, a corporation of New York
No Drawing. Filed Dec. 6, 1962, Ser. No. 242,650
6 Claims. (Cl. 260—250)

This invention relates to 1,2-dimethylhexahydropyridazines, endomethylene analogs thereof, pharmaceutically acceptable addition salts thereof, and a method for their preparation.

The basic compounds of this invention may be represented by the formulae:

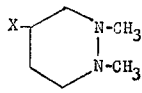

and

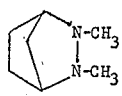

wherein X represents a lower alkyl group containing from 1 to 6 carbon atoms. These basic compounds readily form addition salts.

The compounds of this invention possess pharmacological activity. They exhibit hypotensive action; for instance, a dose of about 10 mg./kg. to hypertensive dogs elicits a drop of about 100 mm. is systolic blood pressure. They also reduce sympathetic vasomotor activity in animals, acting as ganglionic blocking agents in this respect.

The basic compounds of this invention are produced by the reduction of the corresponding 1,2-pyridazine dicarboxylic esters. Such reduction has been found to be achieved conveniently with lithium aluminum hydride. In carrying out the reduction the reducing agent is suspended in an inert organic solvent such as diethyl ether and the ester added thereto. Preferably, the reaction is conducted with stirring and under gentle refluxing. When the reaction is completed, the reducing agent is decomposed by addition of water to the reaction mixture. The reaction mixture is filtered and the ethereal filtrate subjected to distillation to first remove the ether and then under reduced pressure to obtain the end product.

The basic compounds are converted to addition salts by reaction with an alkyl halide such as methyl iodide. The reaction components are brought together in an inert reaction medium such as diethyl ether and after the reaction is completed, the solid salt is filtered.

The following examples illustrate the methods used in and the compounds prepared by this invention.

EXAMPLE I

*1,2-Dimethylhexahydropyridazine*

Lithium aluminum hydride (28.5 g., 0.755 mole) is slurried with absolute ether 1 l.) for ¾ hour in a 2 l., 3-necked flask which is equipped with a sealed stirrer, an addition funnel, and reflux condenser topped by a drying tube. The mixture is stirred while diethyl 3,4,5,6-tetrahydro-1,2-pyridazinedicarboxylate (57.5 g., 0.25 mole) in absolute ether (50 ml.) is added at such a rate as to maintain a gentle reflux. After completion of the addition, about one hour, the mixture is stirred for two hours. Water (55 ml.) is added cautiously to decompose the excess LAH and to hydrolize the complex. The mixture is stirred for an additional hour and then filtered. The residue is washed thoroughly to remove any product. The filtrate is dried over anhy. magnesium sulfate.

The ether is removed by fractionation through an 8-inch, glass helices-packed column. The crude material is distilled, at atmospheric pressure, through a short, glass-spiral column. The yield of product is 23.1 g. (81%), B.P. 137.5–138° C.

EXAMPLE II

*Hexahydro-2,1,2-Trimethylpyridazinium Iodide*

1,2-dimethylhexahydropyridazine (13.0 g., 0.114 mole) in absolute ether (100 ml.) is placed in a flask together with methyl iodide (16.2 g., 0.114 mole). The flask is stoppered and set aside, in the dark, for three days. The crude product is collected on a filter and recrystallized from a minimum amount of methanol. The final yield of title compound is 18.0 g. (61.6%), M.P. 248–249° C. (dec.).

Analysis for $C_7H_{17}N_2I$.—Calc.: C, 32.82; H, 6.69; I, 49.55. Found: C, 32.9, 33.15; H, 6.46, 6.57; I, 49.85, 49.9.

EXAMPLE III

*Hexahydro-4-Isohexyl-1,2-Dimethylpyridazine*

A 2 l. 3-necked flask is equipped with a sealed stirrer, an addition funnel, and a reflux condenser topped by a calcium chloride drying tube. The flask is charged with lithium aluminum hydride (34.0 g., 0.9 mole) and dry ether (1200 ml.); the mixture is stirred for two hours to form a slurry.

The slurry is stirrey while a solution of diethyl 4-isohexyl-3,4,5,6-tetrahydro-1,2-pyridazinedicarboxylate (B.P. 148–149° C. @ 0.8 mm.) (94.2 g., 0.3 mole), prepared by the Diels-Alder reaction between myrcene and diethyl anzodicarboxylate followed by catalytic reduction in ethanol solution with 5% palladium on charcoal (1 gm./10 gm. ester), in absolute ether (100 ml.) is added at such at rate as to maintain a gentle reflux. After the addition is completed, requiring 1½ hours, the mixture is stirred for an hour. Water (80 ml.) is then added cautiously and the mixture is stirred overnight.

The reaction mixture is filtered, and the salts are washed thoroughly with absolute ether. The filtrate and ether washings were combined and dried over anhy. magnesium sulfate.

The solvent is removed by fractionation through a short, glass helices-packed column. The crude material is distilled under reduced pressure through a short, glass-spiral column. The yield of title product is 36.6 g. (61.7%), B.P. 82–82.5° C./1.5 mm.

Analysis for $C_{12}H_{26}N_2$.—Calc.: N, 14.13. Found: N, 14.25.

EXAMPLE IV

*2,3-Dimethyl-2,3-Diazabicyclo 2.2.1 Heptane*

A 3 l. 3-necked flask is equipped with a sealed stirrer, an addition funnel, a a reflux condenser topped by a drying tube. Lithium aluminum hydride (57.0 g., 1.51 moles) is placed in a flask together with 2 l. of anhydrous ether. The mixture is stirred for an hour. To the stirred slurry is added an ethereal solution of diethyl 2,3-diazabicyclo 2.2.1 heptane-2,3-dicarboxylate (121.0 g., 0.5 mole) at such a rate as to maintain a gentle reflux. After completion of the addition, about 1½ hours, the mixture is stirred for an hour. While stirring, water (110 ml.) is cautiously added to decompose the complex and excess LAH.

The mixture is filtered, and the salts are thoroughly washed with anhydrous ether. The combined ethereal solutions are dried over anhydrous magnesium sulfate. The ether is removed by fractionation through a Steadman column. The residue is distilled under reduced pressure to yield 44.4 g. (70%) of title product, B.P. 45–45.5° C./24 mm.

EXAMPLE V

*2,3-Dimethyl-2,3-Diazabicyclo 2.2.1 Heptane Methiodide*

To an ethereal solution of the compound of Example IV (25.0 g., 0.1985 mole) in absolute ether (500 ml.) is added methyl iodide (13 ml.). The solution is stoppered and set aside in the dark for several days. The mixture is filtered, and the product is washed with absolute ether to yield 31.5 g., M.P. 228–229° C. The filtrate is placed in the dark for several more days. The above process is repeated to yield 11.5 g., M.P. 288–229° C.

The total yield of title compound is 43.0 g. (80%). It may be recrystallized from methanol, M.P. 227.5–228.5° C.

Analysis $C_8H_{17}IN_2$.—Calc.: C, 35.83; H, 6.39; I, 47.33; N, 10.45. Found: C, 35.75, 35.91; H, 6.15, 6.15; I, 47.03, 47.25; N, 10.52.

EXAMPLE VI

*Hexahydro-1,2,4-Trimethylpyridazine*

A 2 l., 3-necked flask is equipped with a sealed stirrer, an addition funnel, and a reflux condenser topped by a drying tube. Lithium aluminum hydride (28.5 g., 0.755 mole) is placed in a flask together with absolute ether (1000 ml.) and slurried for an hour. Stirring is continued while diethyl tetrahydro-4-methyl-1, 2-pyridazinedicarboxylate (61.0 g., 0.25 mole) is added slowly keeping the reaction mixture at an gentle reflux. The addition requires 0.5 hour; the stirring is continued for another hour. Then water (55 ml.) is added cautiously. The mixture is stirred overnight at room temperature.

The reaction mixture is filtered, and the solid is washed with ether. The ether washings are added to the ether filtrate and dried over potassium hydroxide pellets. The ether is removed by fractional distillation at atmospheric pressure. The product is distilled under reduced pressure to yield 22.8 g. (71%), B.P. 41–41.5° C./20 mm.

EXAMPLE VII

*Hexahydro-1,1,2,4-Tetramethylpyridazinium Iodide*

The compound of Example VI (6.4 g., 0.05 mole) and methyl iodide (4 ml.) are place in a flask together with ether (250 ml.). The flask is stoppered and set aside in the dark. The mixture is filtered to yield 6.6 g. of the title product. The filtrate is returned to the flask and stoppered. After a week, it is filtered to yield another 1.7. The total yield is 8.3 g. (61.5%), M.P. 228–230° C.

The material may be recrystallized from methanol, M.P. 230–231° C.

Calcd. for $C_8H_{19}IN_2$: I, 46.98; N, 10.37. Found: I, 46.87, 46.71; N, 10.30.

What is claimed is:

1. A member selected from the group consisting of:

(a)

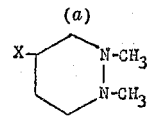

and (b)

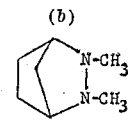

wherein X represents a member of the group consisting of methyl and isohexyl and (c) their methiodide addition salts.

2. 1,2-dimethylhexahydropyridazine.
3. Hexahydro-2,1,2-trimethylpyridiazinium iodide.
4. 2,3-dimethyl-2,3-diazabicyclo 2.2.1 heptane.
5. 2,3-dimethyl-2,3-diazabicyclo 2.2.1 heptane methiodide.
6. Hexahydro-1,2,4-trimethylpyridazine.

References Cited in the file of this patent

Dannley et al.: J. Org. Chem., vol. 20 (1955), pages 92–4.